(12) United States Patent
Relyea, Jr. et al.

(10) Patent No.: US 8,487,885 B2
(45) Date of Patent: Jul. 16, 2013

(54) SELECTABLE OPTIONS FOR GRAPHIC OBJECTS DISPLAYED ON A TOUCH-SCREEN INTERFACE

(75) Inventors: Donald H. Relyea, Jr., Dallas, TX (US);
Shadman Zafar, Coppell, TX (US);
Heath Stallings, Colleyville, TX (US);
Brian F. Roberts, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 790 days.

(21) Appl. No.: 12/343,238

(22) Filed: Dec. 23, 2008

(65) Prior Publication Data
US 2010/0156816 A1    Jun. 24, 2010

(51) Int. Cl.
*G06F 3/041*   (2006.01)
*G06F 3/033*   (2006.01)

(52) U.S. Cl.
USPC ............................................ 345/173; 715/863

(58) Field of Classification Search
None
See application file for complete search history.

(56) References Cited

U.S. PATENT DOCUMENTS

| | | | |
|---|---|---|---|
| 6,104,334 A * | 8/2000 | Allport | 345/169 |
| 2006/0005143 A1 * | 1/2006 | Sakkinen et al. | 715/772 |
| 2008/0143685 A1 * | 6/2008 | Lee et al. | 345/173 |
| 2009/0307631 A1 * | 12/2009 | Kim et al. | 715/830 |
| 2009/0315852 A1 * | 12/2009 | Kocienda et al. | 345/173 |
| 2010/0011304 A1 * | 1/2010 | van Os | 715/762 |

* cited by examiner

*Primary Examiner* — Christopher R Lamb (57) ABSTRACT

Graphic objects may be displayed on the touch-screen display as part of a graphical interface presented to the user. Options relating to the graphic objects may be displayed near or around the object. The options may be displayed as one or more icons that are displayed on the graphical interface and are visually associated with the selected object.

25 Claims, 11 Drawing Sheets

SELECTABLE OPTIONS FOR GRAPHIC OBJECTS DISPLAYED ON A TOUCH-SCREEN INTERFACE

BACKGROUND INFORMATION

Electronic devices continue to increase in complexity and functionality. This poses several challenges to designers of such devices. For example, it may be difficult to develop and provide an intuitive, functional, and convenient user interface for an electronic device having robust functionality, especially when the device is small in size.

Recently, touch-screen displays have become popular user interfaces for certain electronic devices. Touch-screens are especially conducive to small electronic devices at least because they allow for an expansive set of user inputs and can replace other limited input interfaces such as dedicated mechanical input buttons. However, there remains room to improve upon standard touch screen interfaces.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein relate to touch-screen displays, such as a touch-screen implemented as part of a mobile phone or another device. Graphic objects may be displayed on the touch-screen display as part of a graphical interface presented to the user. The user may select the objects by, for example, touching the objects. In response, options relating to the object may be displayed near or around the object. In one implementation, a "trail" of icons visually linked to the graphic object may present the options. In another implementation, the graphic object may be recessed or otherwise modified in its display area and icons may be overlaid in the display area that present the options.

Figure 1:
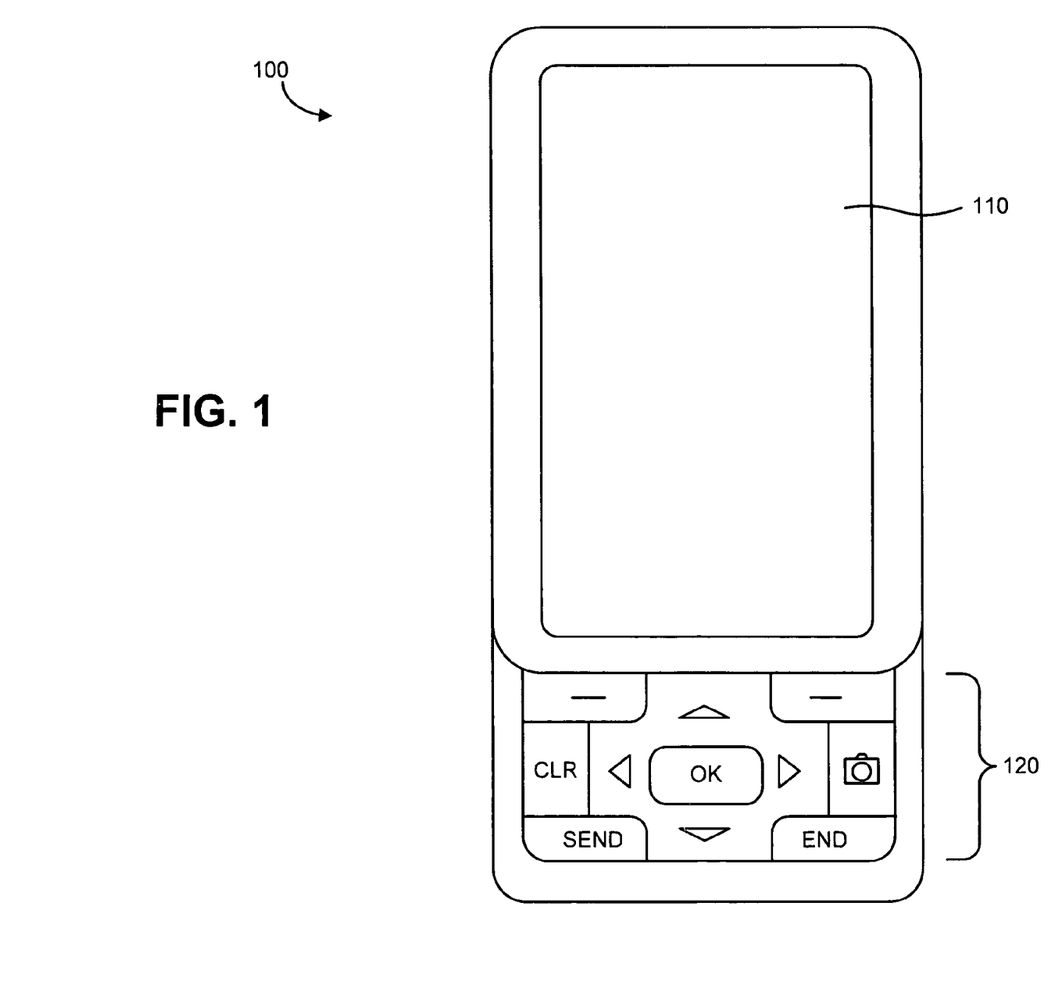
FIG. 1 is a diagram illustrating an exemplary device that includes a touch-screen display.

FIG. 1 is a diagram illustrating an exemplary device 100 that includes a touch-screen. In this example, device 100 is illustrated as a mobile phone that includes a touch-screen 110. Users may interact with device 100 by touching touch-screen 110 with, for instance, a finger.

Device 100 may display one or more graphical user interfaces (GUIs) on touch-screen 110. Examples of GUIs and various GUI views that may be displayed on touch-screen 100 are described in detail below. In addition to touch-screen 110, device 100 may include other input mechanisms, such as one or more input buttons 120. In some implementations, touch-screen 110 and input buttons 120 may be designed so that the touch-screen portion may slide over input buttons 120, leaving only touch-screen 110 visible to the user. In this mode, the user may interact with device 100 solely through touch-screen 110.

Although device 100 is shown as a mobile phone, the concepts described herein may be applicable to any graphical interface presented on a touch-screen. For example, a touch-screen connected to a stand alone computer, laptop, PDA, or other device, may instead be used.

Figure 2:
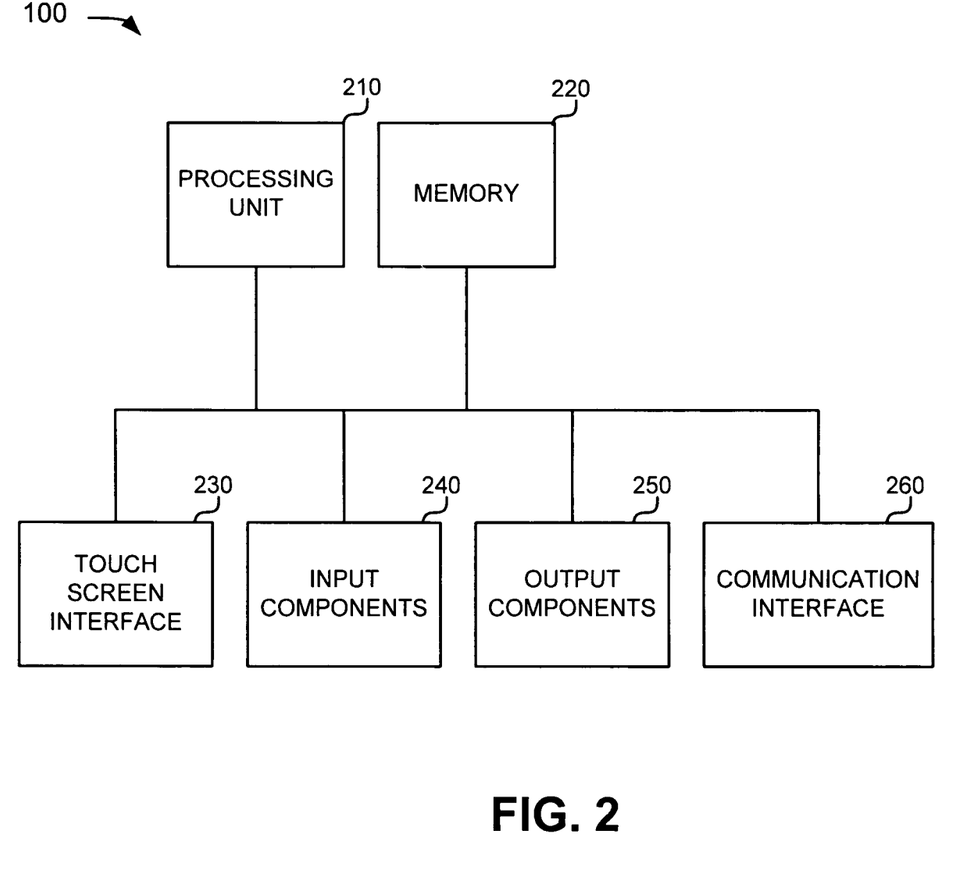
FIG. 2 is a diagram illustrating exemplary components of the device shown in FIG. 1.

FIG. 2 is a diagram illustrating exemplary components of device 100. As shown, device 100 may include a processing unit 210, a memory 220, a touch-screen interface 230, input components 240, output components 250, and a communication interface 260.

Processing unit 210 may include a processor, microprocessor, or other type of processing logic that may interpret and execute instructions. Memory 220 may include computer-readable medium, such as a dynamic or static storage device that may store information and instructions for execution by processing unit 210. For example, memory 220 may include a storing component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Memory 220 may store instructions for execution by processing unit 210. The instructions may implement the graphical interfaces described herein. In addition to storing the instructions for execution by processing unit 210, memory 220 may, in some implementations, additionally store data associated with the user of device 100. For example, memory 220 may store photos, songs, contact information, etc. that belongs to the user of device 100. Although shown as a single element in FIG. 2, memory 220 may be implemented as multiple separate memory elements. For example, memory 220 may include a DRAM, ROM, and flash memory. The DRAM and ROM may generally be used to store instructions for processing unit 210 while the flash memory may generally be used to store user data.

Touch-screen interface 230 may include one or more components for controlling or receiving input from touch-screen 110. Touch-screen interface 230 may, for instance, receive location information describing the location of a user's touch on touch-screen 110.

Input components 240 may include logic for receiving input from device 100 using input interfaces other than touch-screen 110. Input components 240 may include circuitry designed to determine when buttons, such as buttons 120, have been pressed by the user. Input components 240 may also include logic for receiving information from other sources. For example, input components 240 may include a microphone for receiving audio information.

Output components 250 may include logic to control the outputting of data to the user. For instance, output components 250 may include a speaker through which audible information, such as a voice telephone call, may be output. Output components 250 may also include an interface, such as a video driver, for outputting visual information to touch-screen 110. Output components 250 may also implement other types of output, such as circuitry for vibrating device 100, etc.

Communication interface 260 may include logic for implementing network interfaces with other devices. Communication interface 260 may include, for instance, a radio transceiver for connecting device 100 to a cellular network. Communication interface 260 may also include logic for implementing local wireless connections, such as a Bluetooth or WiFi (IEEE 802.11) connection.

The components shown in FIG. 2 for device 100 are exemplary. Device 100 may include additional or fewer components than those shown in FIG. 2. In some situations, certain components may be omitted entirely.

Figure 3:
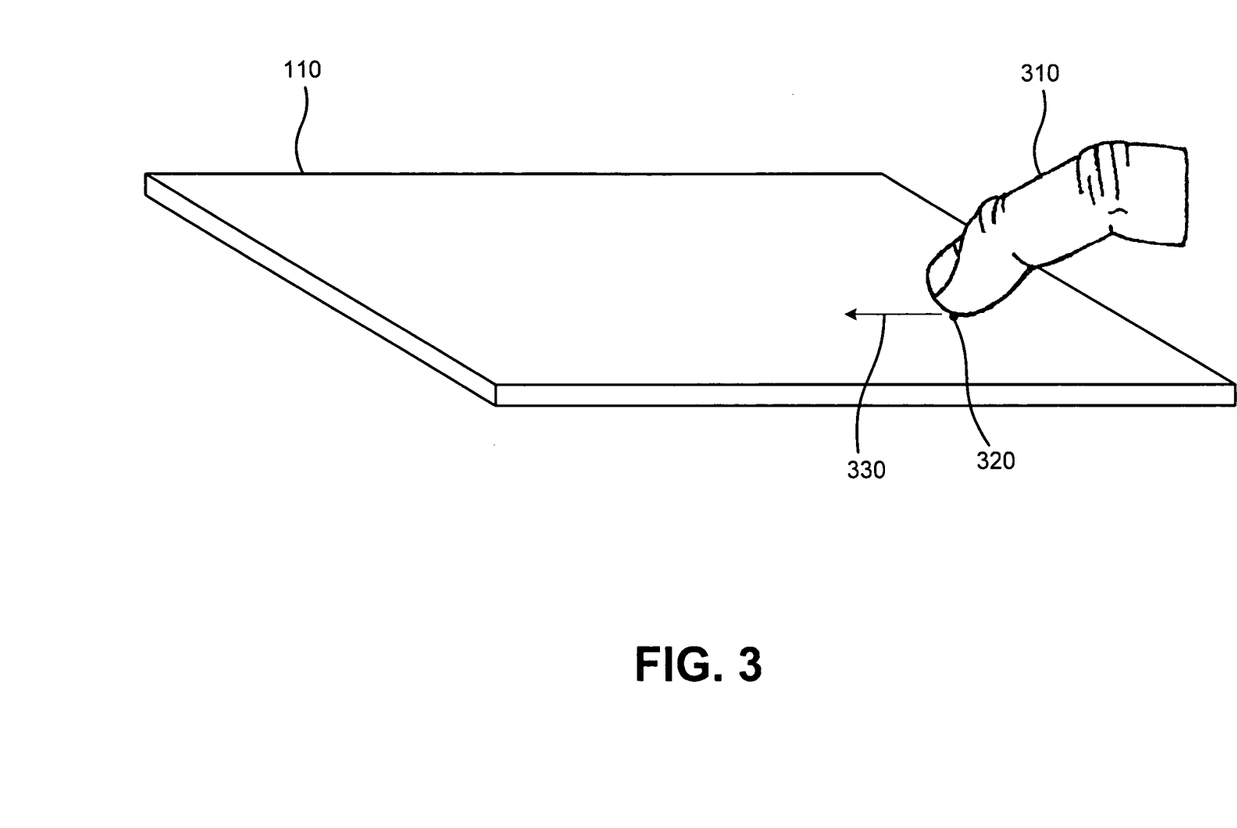
FIG. 3 is a perspective view illustrating exemplary interaction with a touch-screen.

FIG. 3 is a perspective view illustrating interaction with touch-screen 110 by an object 310. In this example, object 310 is the finger of a user. In general, any object that may be sensed by the touch-screen 110 may be used to interact with touch-screen 110. For example, object 310 may include a stylus or any other physical object that can touch and be sensed by touch-screen 110.

When object 310 touches position 320 as shown, touch-screen interface 230 may sense the object touch at position 320 and generate and provide at least one signal representative of the object touch. The signal may be processed by, for example, processing unit 210, to detect the object touch at position 320 and perform an action in response to the detected object touch. Processing unit 210 may be configured to recognize any suitable object touch as may suit a particular implementation, including a generally stationary, temporary, and/or sustained object touch. In certain embodiments, an object touch may include a sustained, generally stationary touch of a position 320 on touch-screen 110 by object 310.

While touching touch-screen 110, object 310 may move about on the surface (e.g., slide across the surface) of touch-screen 110. Such movement of object 310 while touching touch screen 110 may be referred to herein as a "touch gesture." A touch gesture may include any movement of object 310 from a starting position (e.g., position 320) to one or more other positions on touch-screen 110, such as position 330. A touch gesture may include a movement in a particular direction and may thus be associated with a particular direction. Such a touch gesture may be referred to as a "directional touch gesture."

FIG. 3 illustrates an exemplary directional touch gesture including movement of object 310 beginning at position 320 and in a direction represented by arrow 330 in FIG. 3. The example shown in FIG. 3 is just one example of a directional touch gesture. In this example, the directional touch gesture comprises a generally linear movement in a particular direction away from position 320. This is illustrative only. Other directional touch gestures may be used and recognized by touch-screen interface 230.

Figure 4:
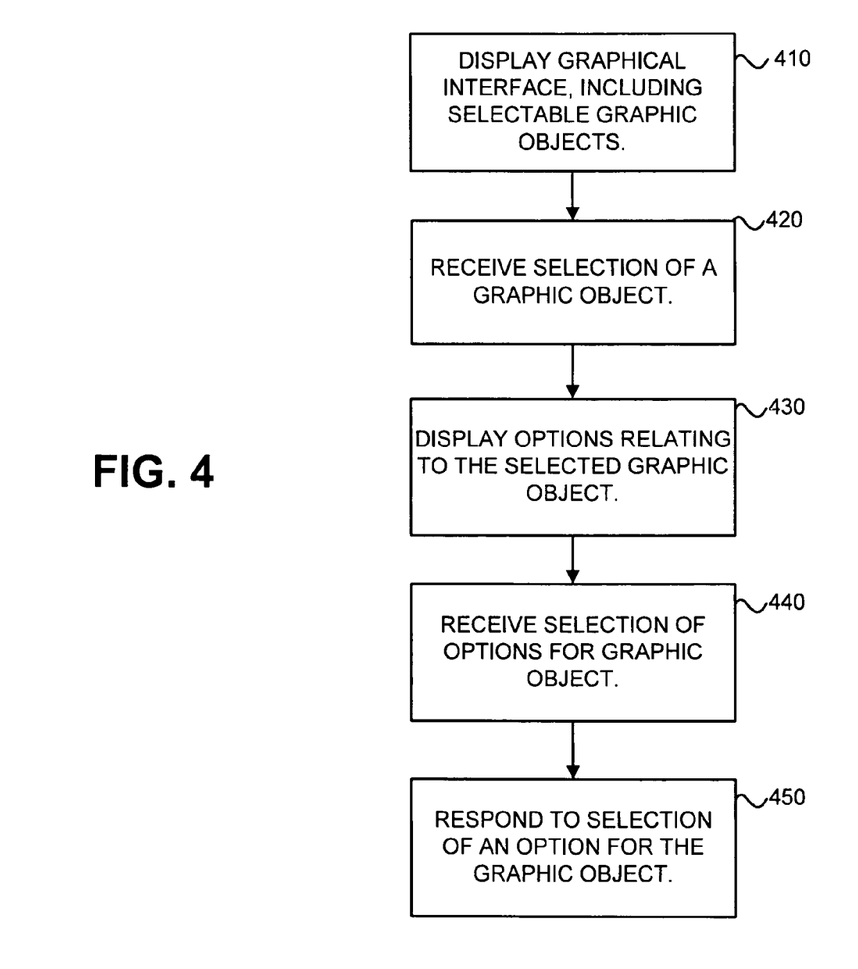
FIG. 4 is a flow chart illustrating exemplary operations for implementing a graphical interface on a touch-screen display.

FIG. 4 is a flow chart illustrating exemplary operations for implementing a graphical interface on touch-screen 110.

Device 100 may display a graphical interface including one or more selectable graphic objects (block 410). The objects may be selectable by interacting with touch-screen 110.

Figure 5:
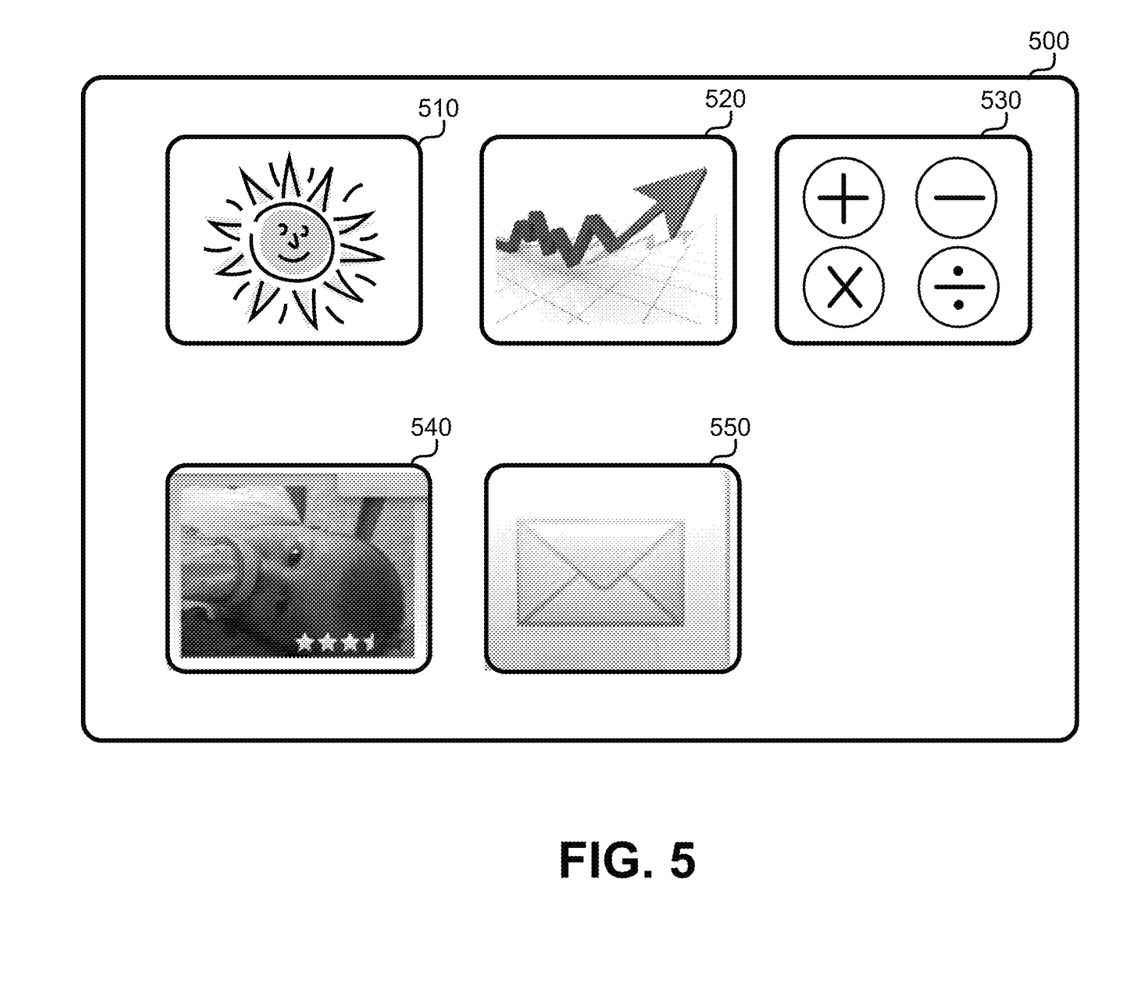
FIG. 5 is a diagram illustrating an exemplary graphical interface displayed on a touch-screen display.

FIG. 5 is a diagram illustrating an exemplary graphical interface 500 displayed on touch-screen 110. Interface 500 may include a number of selectable graphic objects, labeled as objects 510, 520, 530, 540, and 550. Each graphic object 510-550 may be selectable by, for example, touching the object on graphical interface 500. In response, device 100 may perform an action, such as open an application corresponding to the selected object, display options relating to the selected object, enlarge the selected object, etc.

The five exemplary graphic objects shown in FIG. 5 include: a weather graphic object 510, a financial graphic object 520, a calculator graphic object 530, a picture graphic object 540, and an email graphic object 550. Weather object 510 may represent a weather application. Selecting weather object 510 may cause an application to be invoked that presents a weather report to the user. Financial object 520 may represent a stock or other securities quote application. Selecting financial object 520 may cause an application to be invoked that presents financial information to the user. For example, a user may configure financial object 520 to keep track of the price of a select number of stock ticker symbols. Calculator object 530 may represent a calculator application. Selecting calculator object 530 may cause an application to be invoked that presents a calculator to the user. Picture object 540 may be a photo or may represent a photograph display application. Email object 550 may represent user email. Selecting email object 550 may allow the user to send, compose, or read email messages to the user.

Referring back to FIG. 4, device 100 may receive a selection relating to one of the displayed objects (block 420), such as graphic objects 510-550. For example, a user may touch the object on touch-screen 110 to select the object.

Device 100 may display options relating to a selected graphic object (block 430). The options may be displayed in response to a particular selection gesture. For example, the options may be presented in response to a user touching and holding the graphic objects for a certain length of time. In contrast, other gestures, such as quickly tapping the graphic object may result in device 100 performing another action, such as initiating an application associated with the graphic object.

The options presented to the user may depend on the particular object selected. The options may generally include information relating to the graphic object or actions applicable to the graphic objects. Options that may be presented to a user for a selected object will next be discussed in more detail with reference to FIGS. 6-10.

Figure 6:
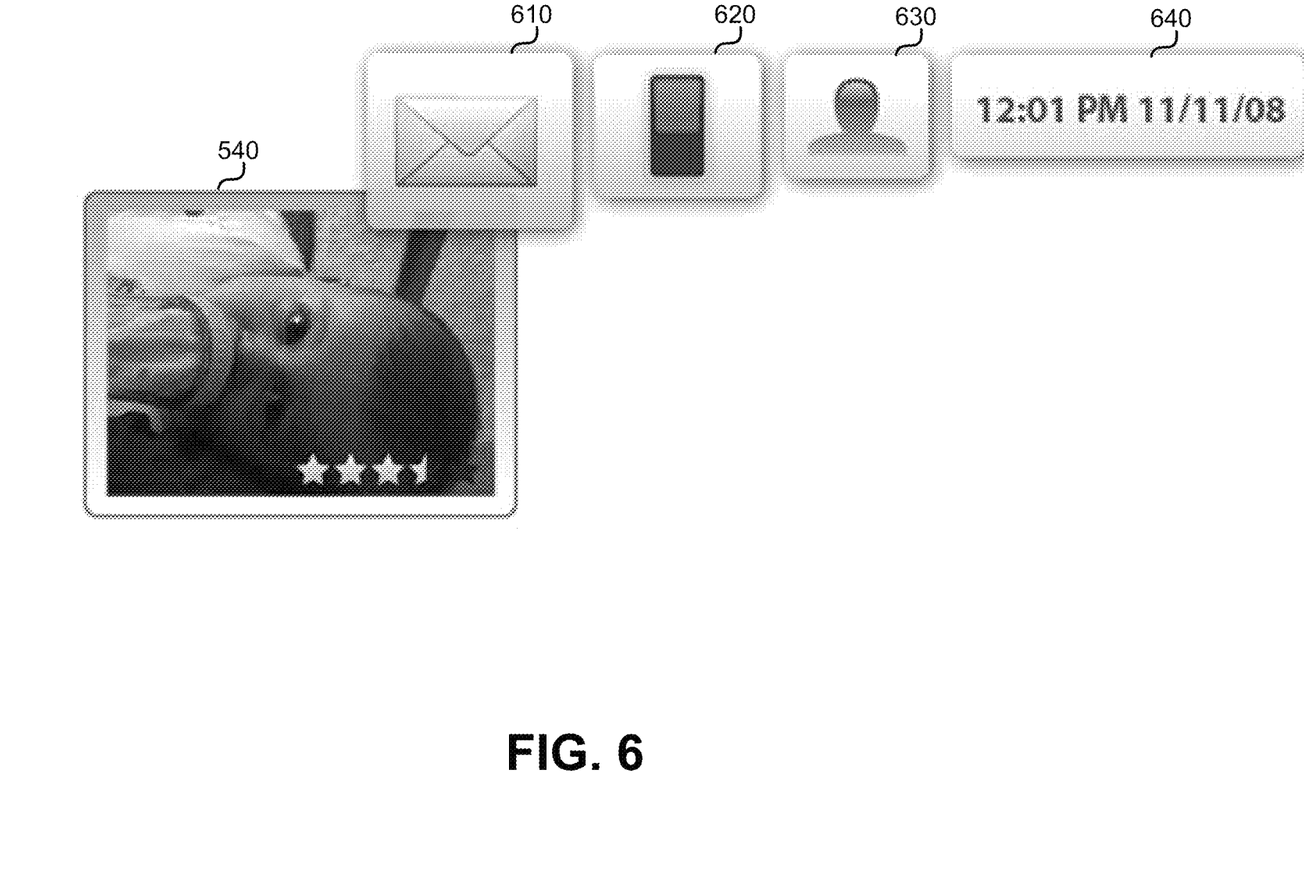
FIGS. 6, 7, and 8 are diagrams illustrating exemplary options presented for a graphic object displayed on a touch-screen display.

FIG. 6 is a diagram illustrating exemplary options presented for graphic object 540. The options for graphic object 540 are shown as icons 610, 620, 630, and 640. The options may be presented for graphic object 540 in response to the user selecting (e.g., touching and holding) graphic object 540 on graphical interface 500.

In some implementations, when the user selects graphic object 540, device 100 may cause graphic object 540 to be shown more prominently in graphical interface 500. For example, the objects other than graphic object 540 may be removed from graphical interface 500, the objects other than graphic object 540 may visually fade into the background of graphical interface 500, graphic object 540 may be moved to a more visually prominent location (such as the center of the screen), or icons 610, 620, 630, and 640 may simply be shown on top of the other selectable graphic objects 510, 520, 530, and 550. For clarity, the other graphic objects 510, 520, 530, and 550 are not shown in FIG. 6.

Each of icons 610, 620, 630, and 640 may represent an action or information relating to graphic object 540. Icons 610, 620, 630, and 640 may be displayed as a "trail" of icons that is visually associated or linked with graphic object 540. For a photo, such as the photo associated with graphic object 540, the icons may relate to information describing how the photo was received. For example, icon 610 may indicate that the photo was received in an email and icon 620 may indicate that the photo was received or taken from another mobile phone. Icon 630 may indicate that contact information is available for the sender of the photo and icon 640 may be a date stamp indicating when the photo was received. In this manner, when the user selects graphic object 540 on touch-screen 110, a visual trail may be displayed that graphically indicates information about the graphic object, such as, in this example, information describing the history of a photo.

As shown in FIG. 6, icons 610, 620, 630, and 640 may be smaller than graphic object 540. In some implementations, however, icons 610, 620, 630, and 640 may be the same size or larger than graphic object 540.

The particular icons to display for a graphic object, such as graphic object 540, may be preset based on the particular graphic object. In some implementations, users may configure which icons they would like to have displayed for a particular graphic object, the maximum number of icons to display, the order that icons are displayed, the graphical representation of each icon, etc. Alternatively, the icons that are displayed may be set by the manufacturer of device 100.

It can be appreciated that the "trail" of icons shown in FIG. 6 for a photo is not limited to being displayed for a photo. In general, any graphic object may be associated with icons that represent information or actions relating to the object. In addition to the information represented by icons 610, 620, 630, and 640, shown in FIG. 6, the information may generally include information relating to the history of the graphic object, a state of an application associated with the graphic object, or other information. For example, for a document stored on device 100, icons representing the document's creation date, author, and the type of document may be displayed.

Figure 7:
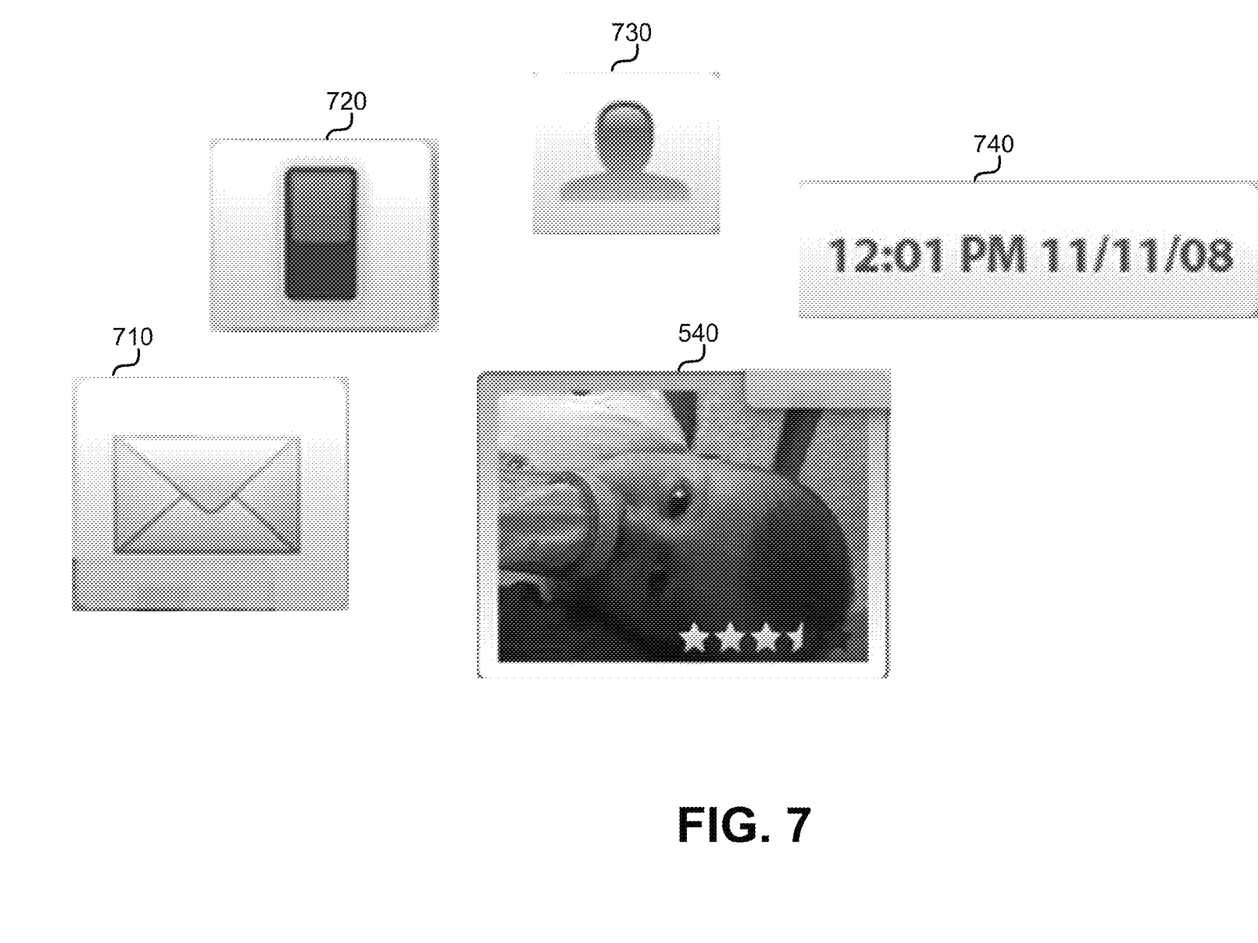

FIG. 6 is another diagram illustrating exemplary options presented for graphic object 540. The options for graphic object 540 are shown as icons 710, 720, 730, and 740. The options may be presented for graphic object 540 in response to the user selecting (e.g., touching and holding) graphic object 540 on graphical interface 500.

Icons 710, 720, 730, and 740 are similar to icons 610, 620, 630, and 640, except that in FIG. 7, icons 710, 720, 730, and 740, instead of being arranged linearly in a trail away from icon 540, are arranged radially to generally surround icon 540. In this implementation, icons 710, 720, 730, and 740 may be more visually tied to graphic object 540 and it may be relatively easy for a user to select one of icons 710, 720, 730, and 740 using a touch-screen drag operation that begins on icon 540.

Figure 8:
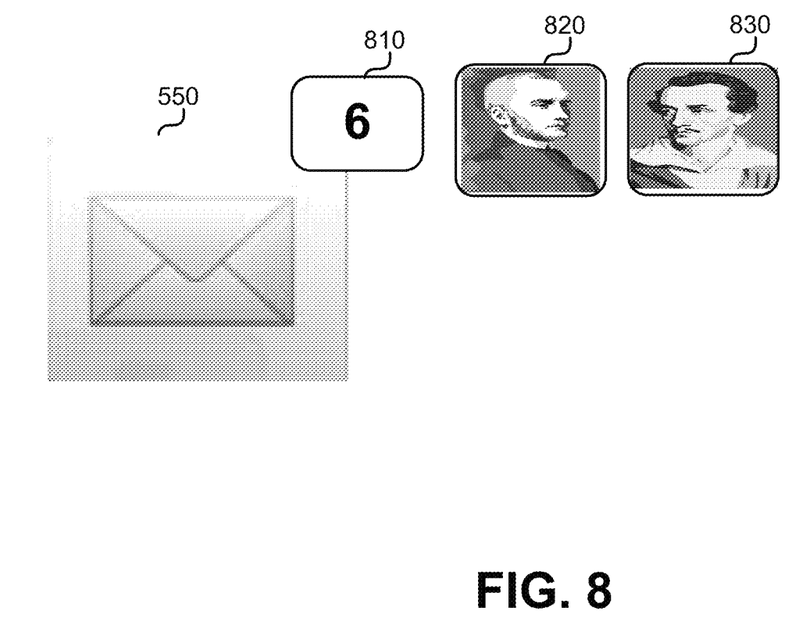

Another example of options shown as a trail of icons is shown in FIG. 8. FIG. 8 is a diagram illustrating exemplary options presented for email graphic object 550. The options for email object 550 are represented by icons 810, 820, and 830. In this case, icons 810, 820, and 830 may graphically provide information relating to the user's email service.

Icon 810 may show the number of new (unread) emails received for the user's account. Icons 820 and 830 may be portraits or other graphical symbols that correspond to people who sent the new emails. In this example, by selecting email object 550, information relevant to the user's email application may be displayed as a trail of small graphical symbols associated with email graphic object 550.

In addition to showing options for a graphic object as a trail or curved trail of icons, as discussed above and as illustrated in FIGS. 6, 7, and 8, concepts described herein may use other techniques to present options for a graphic object on touch-screen 110 (block 430). One such possible technique may, in response to selection of a graphic object, cause the graphic object to visually recess and display icons in, for example, the perimeter of the recessed graphic object. This aspect will be described in more detail below with reference to FIGS. 9 and 10.

Figure 9:
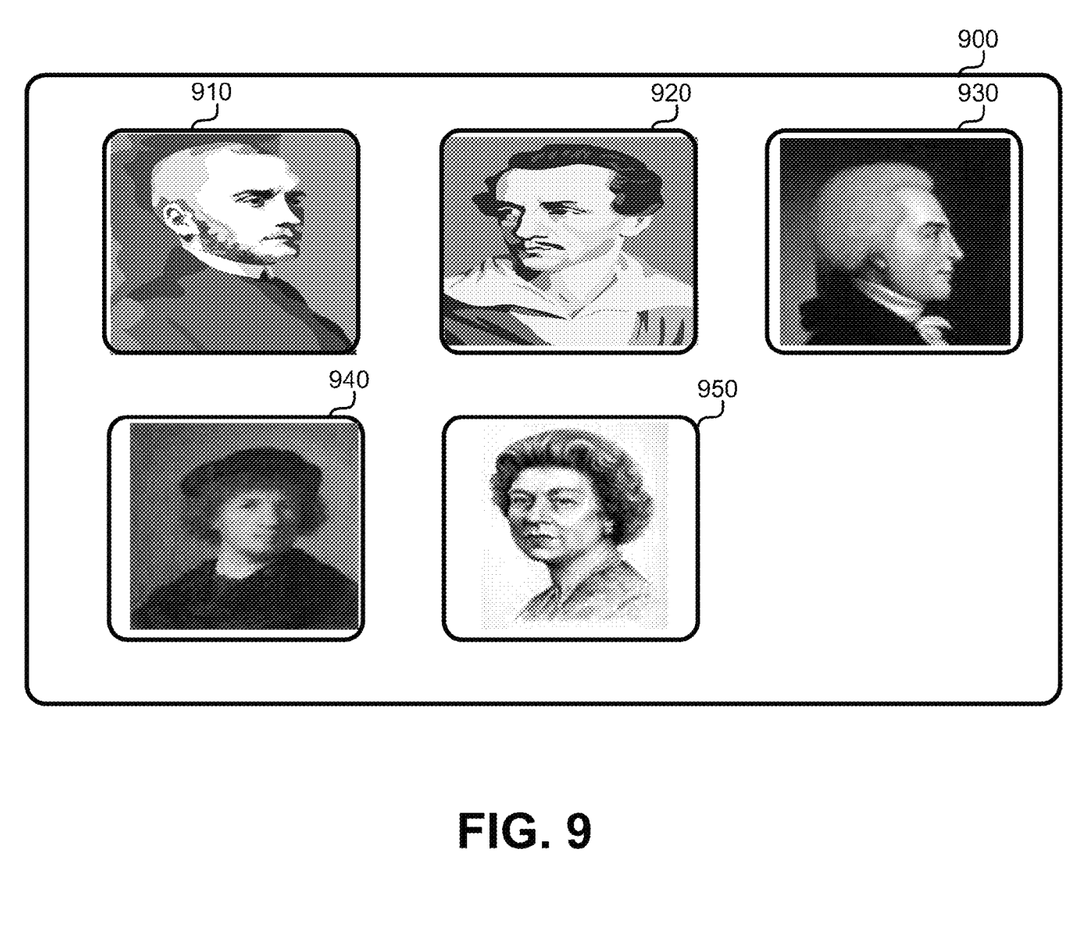
FIG. 9 is a diagram illustrating an another exemplary graphical interface displayed on a touch-screen display.

FIG. 9 is a diagram illustrating another exemplary graphical interface 900 displayed on touch-screen 110. Assume graphical interface 900 is an interface to a graphical contacts application, in which a user may associate contacts with photos or other graphic objects. For example, a user may associate every person in their contact list with a photo of the person. As particularly shown in FIG. 9, graphical interface 900 includes a number of graphic objects 910, 920, 930, 940, and 950. Each graphic object 910-950 may be a photo or other representation that corresponds to a contact in the address book application. Each graphic object 910-950 may be selectable by, for example, touching the object in graphical interface 900 to select the object. In response, device 100 may display options relating to the graphic object.

Figure 10:
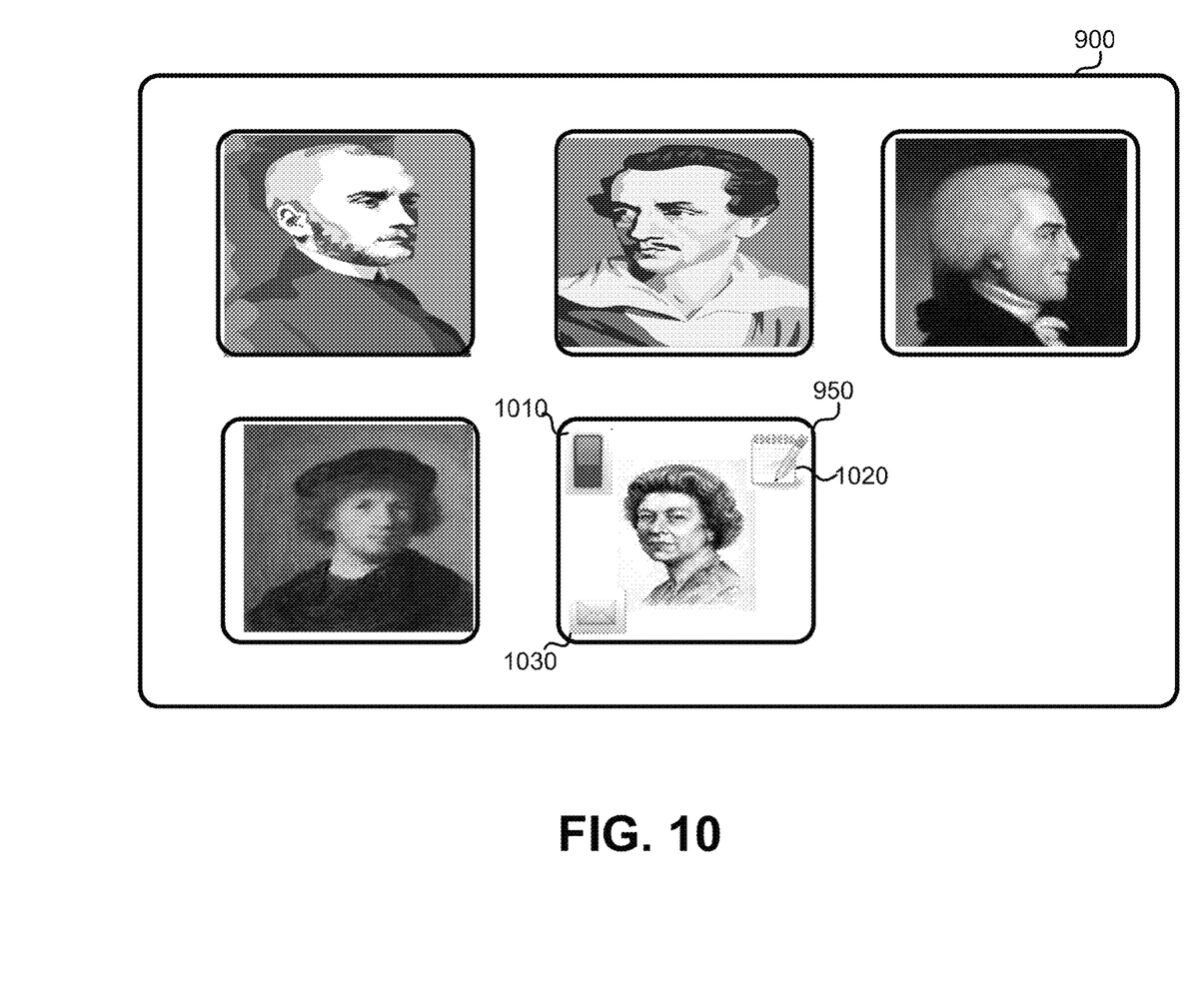
FIG. 10 is a diagram illustrating the graphical interface shown in FIG. 8 in which exemplary options are presented for a selected graphic object.

FIG. 10 is a diagram illustrating the graphical interface shown in FIG. 9 in which exemplary options are presented for a selected graphic object. In this example, assume that the user has selected, through a touch gesture, graphic object 950.

In response to the gesture to view options for graphic object 950, device 100 may add graphic icons in the area corresponding to graphic object 950. In one implementation, the icons may be placed in a perimeter area of the graphic object and the original image corresponding to the graphic object reduced in size to make room for the icons. Advantageously, the screen space devoted to graphic object 950 may not change, and thus the other elements of graphical interface 900 may remain unchanged.

In the example of FIG. 10, graphic object 950 includes a phone icon 1010 in the upper left corner, an editing icon 1020 in the upper right corner, and an email icon 1030 in the lower left corner. Phone icon 1010 may, when selected, cause device 100 to begin a telephone call with the person corresponding to the contact. Editing icon 1020, when selected, may cause device 100 to enter a contact editing mode in which the user can edit the contact information for the person. Email icon 1030, when selected, may cause device 100 to launch an email application in which the user can compose and send email messages.

Although FIG. 10 illustrates icons placed in the perimeter of a reduced size graphic object, in alternative implementations the icons can be placed in other locations. For example, the icons may be superimposed on the original graphic object.

Referring back to FIG. 4, device 100 may receive selections relating to the options (icons) displayed for the graphic objects (block 440), such as the options, represented by icons, as shown in FIGS. 6, 7, 8, and 9. The selections may be made through touch-screen gestures. Device 100 may appropriately respond to the selected option. As described in the examples given above, an "appropriate response" may vary for different graphic objects and different icons associated with each graphic object. In general, device 100 may be configured to respond in any useful way, such as launch an application, display information, play a file, etc. For instance, phone icon 1010, editing icon 1020, and email icon 1030 may be associated with a contact in an address book application, and when selected, each initiate an action related to the contact for which they are displayed (e.g., place a telephone call, initiate an email). Icon 630, when selected, may cause all information associated with the contact to be displayed. Icons 820 and 830 (FIG. 8) may each be associated with a particular email or set of emails and, when selected, may initiate an application to view those emails. In some implementations, an icon shown as an option for a graphic object may have no additional selectable action. For instance, icon 640, which is a time/date stamp for a photo, may not include any additional functionality as the purpose for the icon is satisfied by the icon itself.

The icons that display options for a graphical object, such as icons 810-830, may themselves be related to one another. For example, one icon may illustrate from whom a particular email was sent and another may illustrate the date it was sent. In one implementation, when the user selects or hovers over an icon, graphical paths may be displayed to other related icons may be displayed. For example, an arc may emanate from a selected icon and end at any icons that are related to the selected icon. This could help the user more specifically target the context of the graphical object as it relates to the icons.

Figure 11:
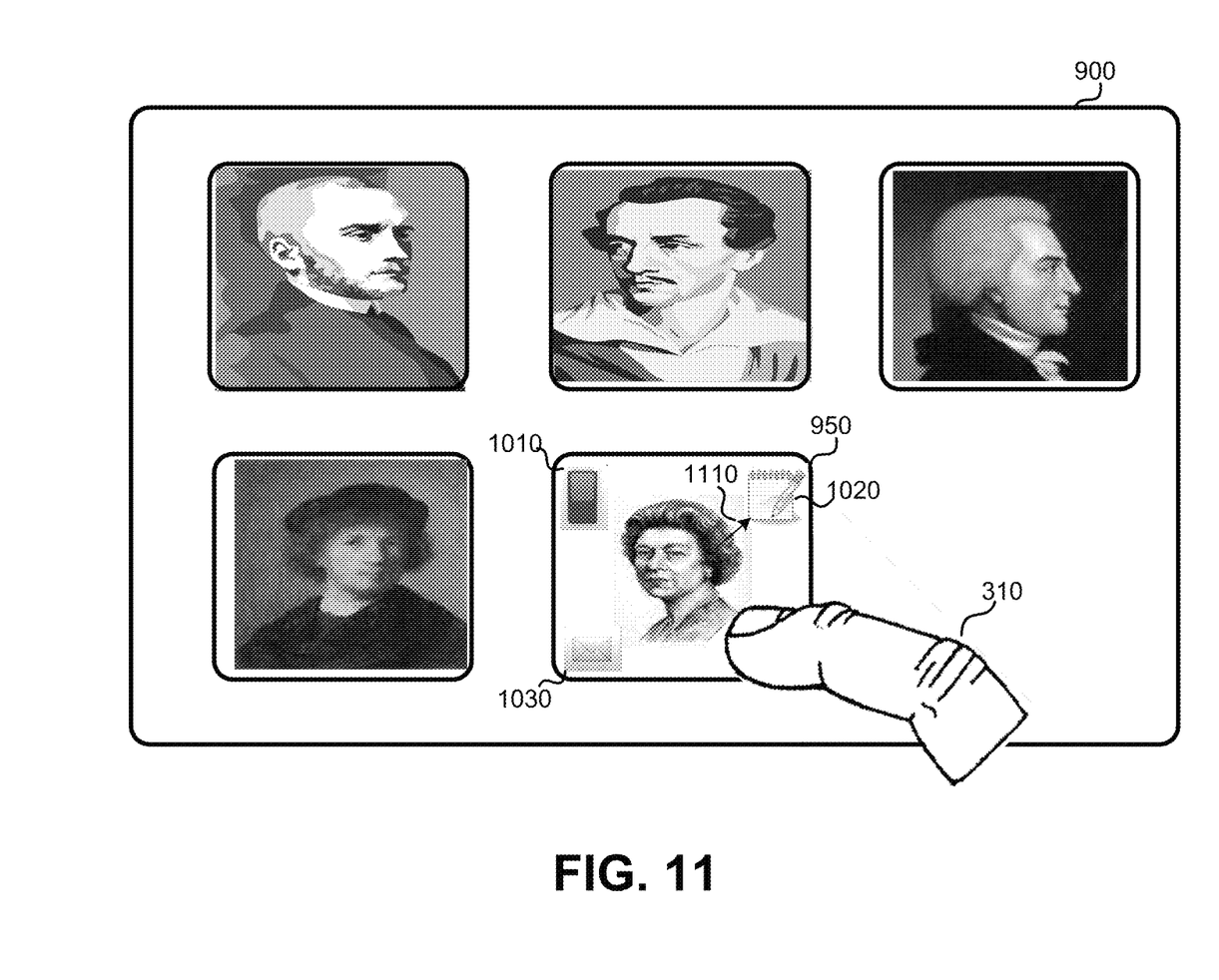
FIG. 11 is a diagram illustrating the exemplary selection of an icon using a gesture.

FIG. 11 is a diagram illustrating the exemplary selection of an icon using a gesture. As shown, assume a user initially selects graphic object 950 through a touch gesture with object 310. In response, device 100 may display icons 1010, 1020, and 1030. The user may then slide object 310 to perform a directional movement gesture in the direction of the icon the user is interested in selecting. For instance, if the user wishes to select editing icon 1020 (to edit the contact information), the user may move object 310 in the direction of arrow 1110 to select editing icon 1020.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks and/or acts have been described with regard to the process illustrated in FIG. 4, the order of the acts and/or blocks may be modified in other implementations. Further, non-dependent acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

What is claimed:

1. A method comprising:
    displaying, by a device, a graphical interface, including a plurality of graphic objects, on a touch-screen display;
    detecting, by the device, a selection of a particular graphic object, of the plurality of graphic objects, based on a touch gesture on the touch-screen display;
    removing, by the device, one or more graphic objects, of the plurality of graphic objects, that are not selected; and
    displaying, by the device and on the graphical interface and based on detecting the selection, a plurality of icons including information related to the particular graphic object,
        a first icon, of the plurality of icons, including information associated with one of:
            a type of communication method used to receive the particular graphic object,
            a date stamp indicating when the device received the particular graphic object, or
            an indication that contact data, associated with a person that transmitted information associated with the particular graphic object, is available,
        a second icon, of the plurality of icons, including information associated with one of:
            the type of communication method used to receive the particular graphic object,
            the date stamp indicating when the device received the particular graphic object, or
            the indication that the contact data is available, and
        the information included in the first icon being different than the information included in the second icon.

2. The method of claim 1, further comprising:
    receiving a particular selection of a particular icon of the plurality of icons; and
    launching an application or displaying additional information relating to the particular icon based on receiving the particular selection.

3. The method of claim 1, where the plurality of icons that are displayed are configurable by a user.

4. The method of claim 1, where the plurality of icons are smaller in size than a graphical representation of the particular graphic object.

5. The method of claim 1, where the plurality of icons are displayed as a trail of one or more icons linked to the particular graphic object.

6. The method of claim 1, where displaying the plurality of icons further includes:
    displaying the plurality of icons overlaid on a graphic corresponding to the particular graphic object.

7. The method of claim 6, where the graphic is a same size as the particular graphic object.

8. The method of claim 6, where the graphic is a modified version of the particular graphic object.

9. The method of claim 6, where the graphic is reduced in size and plurality of icons are displayed in a perimeter area surrounding the graphic corresponding to the particular graphic object.

10. A device comprising:
    a touch-screen display;
    a memory to store programming instructions; and
    a processing unit coupled to the memory and the touch-screen display, the processing unit executing the programming instructions to control the touch-screen display to:
        provide, for presentation on the touch-screen display, a graphical interface, including a plurality of graphic objects,
        detect a selection of a particular graphic object, of the plurality of graphic objects, based on a touch gesture on the touch-screen display,
        remove one or more graphic objects, of the plurality of graphic objects, that are not selected, and
        provide, for presentation on the touch-screen display and based on the selection of the particular graphic object, a plurality of icons on the graphical interface, the plurality of icons each representing information relating to the particular graphic object,
a first icon, of the plurality of icons, including information associated with one of:
a type of communication method used to receive the particular graphic object,
a date stamp indicating when the device received the particular graphic object, or
an indication that contact data, associated with a person that transmitted information associated with the particular graphic object, is available,
a second icon, of the plurality of icons, including information associated with one of:
the type of communication method used to receive the particular graphic object,
the date stamp indicating when the device received the particular graphic object, or
the indication that the contact data is available, and
the information included in the first icon being different than the information included in the second icon.

11. The device of claim 10, where at least one of the plurality of icons provides information relating to a history of the particular graphic object.

12. The device of claim 11, where the processing unit is further to control the touch-screen display to:
cause the one or more graphic objects, of the plurality of graphic objects, that are not selected to visually fade into a background of the touch-screen display.

13. The device of claim 10, where the device includes a mobile phone.

14. The device of claim 10, where the processing unit further controls the touch-screen display to:
receive a particular selection of one of the plurality of icons; and
launch an application or displaying additional information relating to the selected icon based on receiving the particular selection.

15. The device of claim 10, where the plurality of icons are smaller in size than the particular graphic object.

16. The device of claim 10, where the plurality of icons are displayed as a trail of one or more icons linked to the particular graphic object.

17. The device of claim 10, where the plurality of icons are overlaid on the particular graphic object.

18. The device of claim 17, where the particular graphic object is reduced in size and the plurality of icons are displayed in a perimeter area surrounding the particular graphic object.

19. A method comprising:
displaying, by a device, a graphical interface, including a plurality of graphic objects, on a touch-screen display;
detecting, by the device, a selection of a particular graphic object, of the plurality of graphic objects;
removing, by the device, one or more graphic objects, of the plurality of graphic objects, that are not selected;
displaying, by the device and on the graphical interface, a plurality of icons as a trail of icons linked to the particular graphic object, each icon, of the plurality of icons, including information about the particular graphic object,
a first icon, of the plurality of icons, including information associated with one of :
a type of communication method used to receive the particular graphic object,
a date stamp indicating when the device received the particular graphic object, or
an indication that contact data, associated with a person that transmitted information associated with the particular graphic object, is available,
a second icon, of the plurality of icons, including information associated with one of:
the type of communication method used to receive the particular graphic object,
the date stamp indicating when the device received the particular graphic object, or
the indication that the contact data is available, and
the information included in the first icon being different than the information included in the second icon;
receiving, by the device, a selection, via the touch-screen display, of an icon of the plurality of icons; and
performing, by the device, an action associated with the selected icon.

20. The method of claim 19, where performing the action includes launching an application relating to the selected icon or displaying additional information relating to the selected icon.

21. The method of claim 19, where the trail of icons presents a history relating to the particular object.

22. The method of claim 19, where the particular graphic object includes an image and the trail of icons related to information about the image.

23. A non-transitory computer-readable medium comprising instructions, the instructions comprising:
one or more instructions, executable by a processor, to cause the processor to display a graphical interface, including a plurality of graphic objects, on a touch-screen display;
one or more instructions, executable by the processor, to cause the processor to detect a selection of a particular graphic object, of the plurality of graphic objects, based on a touch gesture on the touch-screen display;
one or more instructions, executable by the processor, to cause the processor to remove one or more graphic objects, of the plurality of graphic objects, that are not selected; and
one or more instructions, executable by the processor, to cause the processor to display, on the graphical interface, a plurality of icons including information related to the particular graphic object,
a first icon, of the plurality of icons, including information associated with one of:
a type of communication method used to receive the particular graphic object,
a date stamp indicating when the device received the particular graphic object, or
an indication that contact data, associated with a person that transmitted information associated with the particular graphic object, is available,
a second icon, of the plurality of icons, including information associated with one of:
the type of communication method used to receive the particular graphic object,
the date stamp indicating when the device received the particular graphic object, or
the indication that the contact data is available, and
the information included in the first icon being different than the information included in the second icon.

24. The medium of claim 23, where the plurality of icons are displayed as a trail of icons linked to the particular graphic object.

25. The medium of claim 23, further comprising:
one or more instructions, executable by the processor, to display the plurality of icons overlaid on a graphic corresponding to the particular graphic object.

* * * * *